April 19, 1966  C. A. OPPEDAHL  3,247,460

D.C. AMPLIFIER UTILIZING SATURABLE CORES

Filed Nov. 29, 1962

INVENTOR.
CHARLES A. OPPEDAHL
BY
ATTORNEY

---

United States Patent Office 3,247,460
Patented Apr. 19, 1966

---

3,247,460
D.C. AMPLIFIER UTILIZING SATURABLE CORES
Charles A. Oppedahl, Cedar Rapids, Iowa, assignor to Collins Radio Company, Cedar Rapids, Iowa, a corporation of Iowa
Filed Nov. 29, 1962, Ser. No. 240,889
4 Claims. (Cl. 330—8)

This case relates in general to a direct current amplifier, and in particular to a direct current amplifier which utilizes magnetic cores.

It is oftentimes desirable to amplify direct current signals of low amplitude so that such signals can be used to control an indicator or a servo system.

It is an object of the present invention to provide a direct current amplifier which uses magnetic cores. Another object of this invention is to provide a miniaturized D.C. amplifier.

A feature of this invention is found in the provision for a direct current amplifier which uses magnetic cores.

Further objects, features and advantages of this invention will become apparent from the following description and claims when read in view of the drawings in which:

Figure 1:
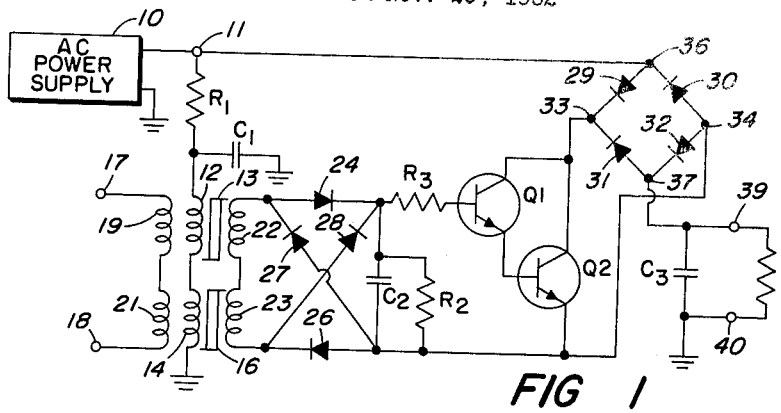
FIGURE 1 is a schematic view of the direct current amplifier of this invention.

FIGURE 1 illustrates an A.C. power supply 10 which has one side connected to ground, and the other side connected to terminal 11. Terminal 11 is connected to a resistor $R_1$, that has its other side connected to a winding 12 on a magnetic core 13. A winding 14 is connected in series with winding 12, and is wound on magnetic core 16. The other side of winding 14 is connected to ground. Terminals 17 and 18 have a suitable control current connected to them which is to be amplified. Terminal 17 is connected to a winding 19, and terminal 18 is connected to winding 21. Windings 19 and 21 are connected together. Winding 19 is wound on core 13, and winding 21 is wound on core 16.

A condenser $C_1$ is connected between ground and the junction point between resistor $R_1$ and winding 12. A winding 22 is wound on core 13 and is connected to winding 23 which is wound on core 16. A diode rectifying circuit comprising diodes 24, 26, 27, and 28 is connected across windings 22 and 23, and a time constant circuit comprising condenser $C_2$ and $R_2$, are connected across the output of the rectifying circuit.

A resistor $R_3$ is connected between one side of the rectifying circuit and the base of a transistor $Q_1$. The output of transistor $Q_1$ is connected to transistor $Q_2$. The transistor $Q_1$ and $Q_2$ are amplifiers and are connected to a diode gating circuit comprising diodes 29, 30, 31 and 32, and in particular, are connected to points 33 and 34 of the gating circuit.

Terminal 11 of the A.C. power supply is connected to point 36 of the gating circuit, and point 37 of the gating circuit is connected to an output circuit comprising a condenser $C_3$ which has its opposite side connected to ground. A pair of output terminals 39 and 40 are connected across condenser $C_3$, and a suitable load $R_L$ is connected across contacts 39 and 40. The load $R_L$ might be an indicator or a servo system for example.

This invention operates with cores which saturate at different values. One of the cores 13 and 16 will nearly always saturate prior to the other one.

Figure 2:
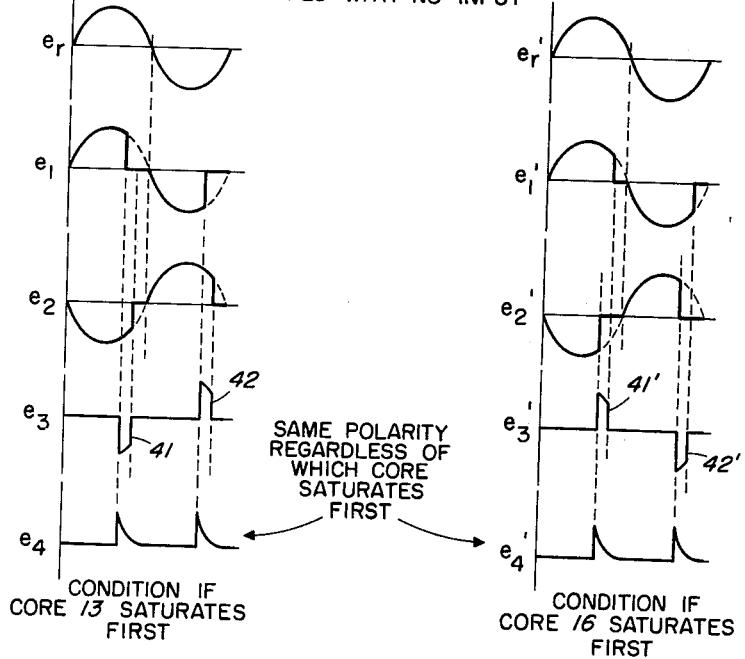
FIGURE 2 illustrates the various wave shapes appearing at various points in this invention.

In FIGURE 2 with the condition of no input to terminals 17 and 18 $e_r$ and $e'_r$ illustrate the output of the power supply 10 which is connected to the windings 12 and 14. Curves $e_1$ and $e'_1$ illustrate the waveform appearing on winding 22. Curves $e_2$ and $e'_2$ illustrate the waveform appearing on winding 23. The waveforms appearing on windings 22 and 23 when combined present a pair of spikes 41, 41' and 42, 42' to the input of the rectifier circuit. These spikes will be of equal amplitude with no current supplied to terminals 17 and 18.

The spikes are formed because of the different saturation times of cores 13 and 16. As seen from waveforms $e_1$ and $e_2$ of FIGURE 2 windings 22 and 23 will respectively produce said waveforms having a sharp cut out area when the cores saturate. The combined voltage of these two waveforms as presented to the input of the rectifying circuit results in the spiked waveform represented by $e_3$ of FIGURE 2. This is readily apparent from the dotted lines in FIGURE 2 which shows the cancelling effect of the pulses after saturation of the cores 13 and 16 occur.

The rectifying circuit comprising diodes 24, 27 and 28 will reverse the negative spike so that both are positive and the time constant circuit comprising resistor $R_2$ and condenser $C_2$ will produce an exponential trailing edge on the spikes as shown by $e_4$ and $e'_4$ in FIGURE 2. The amplifiers $Q_1$ and $Q_2$ will supply the $e_4$ waveform to terminals 33 and 34 of the gating diodes 29, 30, 31 and 32, and if the spikes 41 and 42 of $e_3$ or 41' and 42' of $e'_3$ are equal the spikes fed to $Q_1$ will be equal, and the gating diodes will allow the condenser $C_3$ to receive equal energy on the positive and negative half cycles. Thus, there will be no net direct current supplied to the load $R_L$.

Figure 3:
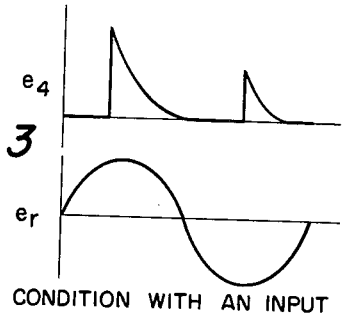
FIGURE 3 illustrates the wave shapes with an input.

However, if a direct current input is applied to terminals 17 and 18, the $e_4$ or $e'_4$ produced by 41, 41' and 42, 42' will not have equal amplitude and the time constant circuit $C_2R_2$ will produce pulses of different areas. This is shown in FIGURE 3. When these pulses are fed to the gating points 33 and 34 of the gating circuit, the output of the A.C. power supply will be supplied to condenser $C_2$ in a differential fashion so that the condenser $C_3$ will be charged to a net positive or negative value depending upon the polarity of the input signal supplied to the terminals 17 and 18. Thus, with no input supplied to terminals 17 and 18, no output will appear at the output terminals 39 and 40. With an input of a first polarity an output of one polarity will appear at terminals 39 and 40. When the control signal reverses in polarity, the output will also reverse in polarity. Thus, it is seen that this invention provides a direct current amplifier of a relatively simple construction which has no moving parts.

Although the invention has been described with respect to a preferred embodiment thereof, it is not to be so limited, as changes and modifications may be made therein which are within the full intended scope of the invention as defined by the appended claims.

I claim:

1. A direct current amplifier comprising a pair of magnetic cores, said magnetic cores having different saturation values, a pair of input windings connected together and wound about said cores, a pair of control windings connected together and wound on said cores, a pair of output windings connected together and wound about said cores, means for rectifying the output of the output windings, an amplifier, a gating circuit receiving the output of the rectifying means through said amplifier, an A.C. power supply connected to the second pair of control windings and to the gating circuit, and an output circuit connected to said gating circuit.

2. In apparatus according to claim 1, a time constant comprising a resistor and capacitor connected across the output of the rectifying means.

3. A direct current amplifier comprising a pair of magnetic cores, said magnetic cores having different saturation values, three windings mounted on the first core, three more windings mounted on the second core, first ones of the first and second windings connected together, an A.C. power supply connected to the first of the first windings, second ones of the windings connected together, an input connected to said second windings, third one of said windings connected together, a rectifying circuit connected across the third windings, a time constant circuit connected across the rectifying means, an amplifier connected to the rectifying means, a gating circuit connecetd to the output of the amplifier, the power supply connected to the gating circuit, and an ouput circuit connected to the gating circuit.

4. In apparatus according to claim 3 where the output circuit comprises a condenser connected across a pair of output terminals.

References Cited by the Examiner
UNITED STATES PATENTS

| | | |
|---|---|---|
| 2,740,086 | 3/1956 | Evans et al. |
| 2,977,481 | 3/1961 | Rosa. |
| 2,979,614 | 4/1961 | Woodworth _____ 330—8 X |
| 3,033,997 | 5/1962 | Salihi. |
| 3,085,163 | 4/1963 | Burstow. |

ROY LAKE, *Primary Examiner.*

NATHAN KAUFMAN, *Examiner.*